United States Patent
Charron et al.

(10) Patent No.: US 9,322,335 B2
(45) Date of Patent: Apr. 26, 2016

(54) GAS TURBINE COMBUSTOR EXIT PIECE WITH HINGED CONNECTIONS

(71) Applicants: Richard C. Charron, West Palm Beach, FL (US); William W. Pankey, Palm Beach Gardens, FL (US)

(72) Inventors: Richard C. Charron, West Palm Beach, FL (US); William W. Pankey, Palm Beach Gardens, FL (US)

(73) Assignee: SIEMENS ENERGY, INC., Orlando, FL (US)

(*) Notice: Subject to any disclaimer, the term of this patent is extended or adjusted under 35 U.S.C. 154(b) by 637 days.

(21) Appl. No.: 13/834,185

(22) Filed: Mar. 15, 2013

(65) Prior Publication Data

US 2014/0260317 A1    Sep. 18, 2014

(51) Int. Cl.
*F02C 7/20* (2006.01)
*F01D 9/02* (2006.01)
*F23R 3/42* (2006.01)

(52) U.S. Cl.
CPC . *F02C 7/20* (2013.01); *F01D 9/023* (2013.01); *F23R 3/425* (2013.01); *F05D 2250/25* (2013.01)

(58) Field of Classification Search
CPC ............... F01D 9/023; F23R 3/60; F23R 3/46
USPC ......................................................... 60/796
See application file for complete search history.

(56) References Cited

U.S. PATENT DOCUMENTS

| | | | |
|---|---|---|---|
| 2,567,079 A | 9/1951 | Owner et al. | |
| 2,608,057 A | 8/1952 | Boyd et al. | |
| 2,699,040 A | 1/1955 | Gaubatz | |
| 2,765,620 A | 10/1956 | Egbert | |
| 3,018,624 A | 1/1962 | Bonsall et al. | |
| 3,608,310 A | 9/1971 | Vaught | |
| 3,657,882 A | 4/1972 | Hugoson | |
| 3,804,335 A | 4/1974 | Sohre | |
| 4,158,949 A | 6/1979 | Reider | |
| 5,706,646 A | 1/1998 | Wilde et al. | |
| 5,761,898 A | 6/1998 | Barnes et al. | |
| 5,953,919 A | 9/1999 | Meylan | |
| 6,644,032 B1 | 11/2003 | Jorgensen et al. | |
| 7,721,547 B2 | 5/2010 | Bancalari et al. | |
| 8,230,688 B2 | 7/2012 | Wilson et al. | |
| 2006/0288707 A1 | 12/2006 | Weaver et al. | |
| 2008/0202124 A1 | 8/2008 | Sutcu et al. | |
| 2010/0037617 A1* | 2/2010 | Charron | F01D 9/023 60/752 |
| 2010/0037817 A1 | 2/2010 | Charron et al. | |
| 2010/0077719 A1* | 4/2010 | Wilson | F23R 3/425 60/39.37 |
| 2010/0180605 A1* | 7/2010 | Charron | F01D 9/023 60/796 |
| 2011/0203282 A1* | 8/2011 | Charron | F01D 9/023 60/722 |
| 2012/0304664 A1* | 12/2012 | Cihlar | F01D 9/023 60/796 |

FOREIGN PATENT DOCUMENTS

EP    2530381 A1    12/2012

* cited by examiner

Primary Examiner — Jason Shanske (57) ABSTRACT

An exit piece (66) with an inlet throat (67) that conducts a combustion gas flow (36A) in a path (82) from a combustor (63) to an annular chamber (68) that feeds the first blade section (37) of a gas turbine (26). The exit piece further includes an outlet portion (69) that forms a circumferential segment of the annular chamber. The outlet portion interconnects with adjacent outlet portions by hinges (78A, 78B, 80A, 80B). Each hinge may have a hinge axis (82A, 82B) parallel to a centerline (21) of the turbine. Respective gas flows (36A) are configured by an assembly (60) of the exit pieces to converge on the feed chamber (68) into a uniform helical flow that drives the first blade section with minimal circumferential variations in force.

18 Claims, 6 Drawing Sheets

United States Patent US 9,322,335 B2

GAS TURBINE COMBUSTOR EXIT PIECE WITH HINGED CONNECTIONS

STATEMENT REGARDING FEDERALLY SPONSORED DEVELOPMENT

Development for this invention was supported in part by Contract No. DE-FC26-05NT42644, awarded by the U.S. Department of Energy. Accordingly, the U.S. Government may have certain rights in this invention.

FIELD OF THE INVENTION

This invention relates generally to gas turbine combustion engines. In particular, it relates to an apparatus and assembly for conducting combustion gas from can-annular combustors to the first row of turbine blades.

BACKGROUND OF THE INVENTION

Gas turbine engines with can annular combustors require structures to conduct and direct the gasses from the combustors to the first row of turbine blades. These structures must orient the combustion gas flow streams to contact the turbine blades at an optimum angle for rotation of the blades. Conventional structures include transition ducts, stationary vanes, and seals. Each transition duct conducts gas from a combustor to the vanes which are immediately upstream of the blades. The vanes orient the gas flow circumferentially and direct it toward the blades.

This configuration reduces the amount of energy present in the gas flow as the flow travels toward the first row of turbine blades, and it requires substantial cooling. Energy is lost as the flow transitions from one component to the next, and cold air can leak into the hot gas path. Cold air leakage into the hot gas path through seals increases as seals wear due to vibration and ablation. Energy is also lost when the flow is redirected by the vanes.

The cooled components are expensive and complicated to manufacture due to the cooling structures, exacting tolerance requirements, and unusual shapes. Layers of thermal insulation for such cooled components may wear and can be damaged. Vane surfaces and thermal insulation layers thereon are prone to damage due to their oblique orientation relative to the flow. Such damage may necessitate component repair or replacement, which creates costs in terms of materials, labor, and downtime. Thermal stresses also reduce the service life of the underlying materials. Further, the vanes and seals require a flow of cooling fluid. This takes energy and creates more opportunities for heat-related component damage and associated costs.

Turbine vanes are produced in segments and then assembled together to form a ring. This requires additional seals between the vane components, through which there may be more cold air leakage into the hot gas path. Further, these configurations usually require assembly of the components directly onto the engine in confined areas of the engine, which is time consuming and difficult.

BRIEF DESCRIPTION OF THE DRAWINGS

The invention is explained in the following description in view of the drawings that show.

DETAILED DESCRIPTION OF THE INVENTION

The present invention includes improvements related to the commonly owned United States patent application published on 25 Aug. 2011 as Publication Number US 2011/0203282 A1, which is incorporated herein by reference. An embodiment of the present invention includes a combustor gas flow directing apparatus that minimizes turns in the flow, minimizes seals, minimizes stress variations on the rotating turbine blades, reduces working fluid dynamic energy losses, and eliminates the need for a first row of stationary vanes. It includes a transition duct exit piece with an outlet portion that forms a segment of an annular combustion gas feed chamber immediately ahead of the first row of rotating turbine blades, and a connection arrangement between adjacent exit pieces in a gas turbine engine.

Figure 1:
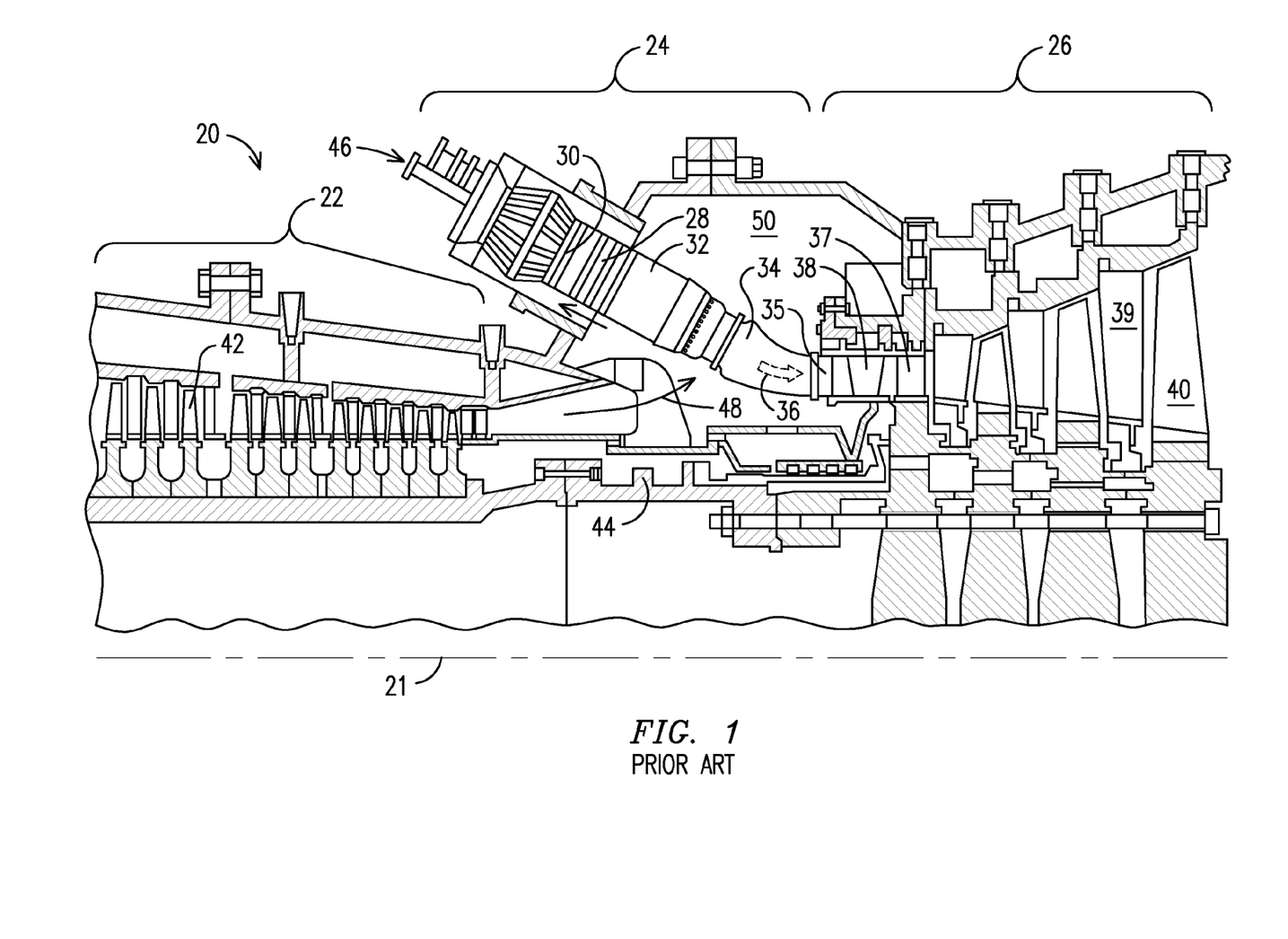
FIG. 1 is a sectional side view of a prior art gas turbine engine.

FIG. 1 is a partial side sectional view of a prior art gas turbine engine 20 with a centerline 21, a compressor section 22, a combustion section 24, and a turbine section 26. Each combustor 28 has an upstream end 30 and a downstream end 32 relative to a working gas flow through the combustor. A transition duct 34 and an exit piece 35 conduct the combustion gas 36 from the combustor to the first stage of rotating blades 37 of the turbine section 26. Stationary vanes 38 redirect the incoming flow 36 to an optimum circumferential/axial flow angle to drive the first stage blades 37. Other rows of stationary vanes 39 may precede other rows of rotating blades 40 in further stages of the turbine section 26. Compressor blades 42 are driven by the turbine blades 37, 40 via a common shaft 44. Fuel 46 enters each combustor. Compressed air 48 enters a plenum 50 around the combustors. It enters the upstream end 30 of the combustors, and is mixed with fuel for combustion. It also surrounds the combustor 28 and the transition duct 34 to provide cooling air. It has a higher pressure than the working gas in the combustor and in the transition duct. Each flow 36 is discrete until it leaves a transition duct 34 immediately upstream of the stationary vanes 38. The vanes 38 further divide these discrete flows prior to each flow reaching the blades 37. Thus, the blades receive circumferentially varying forces from the combustion gas streams 36 as the blades rotate through the divided and redirected flows.

Figure 2:
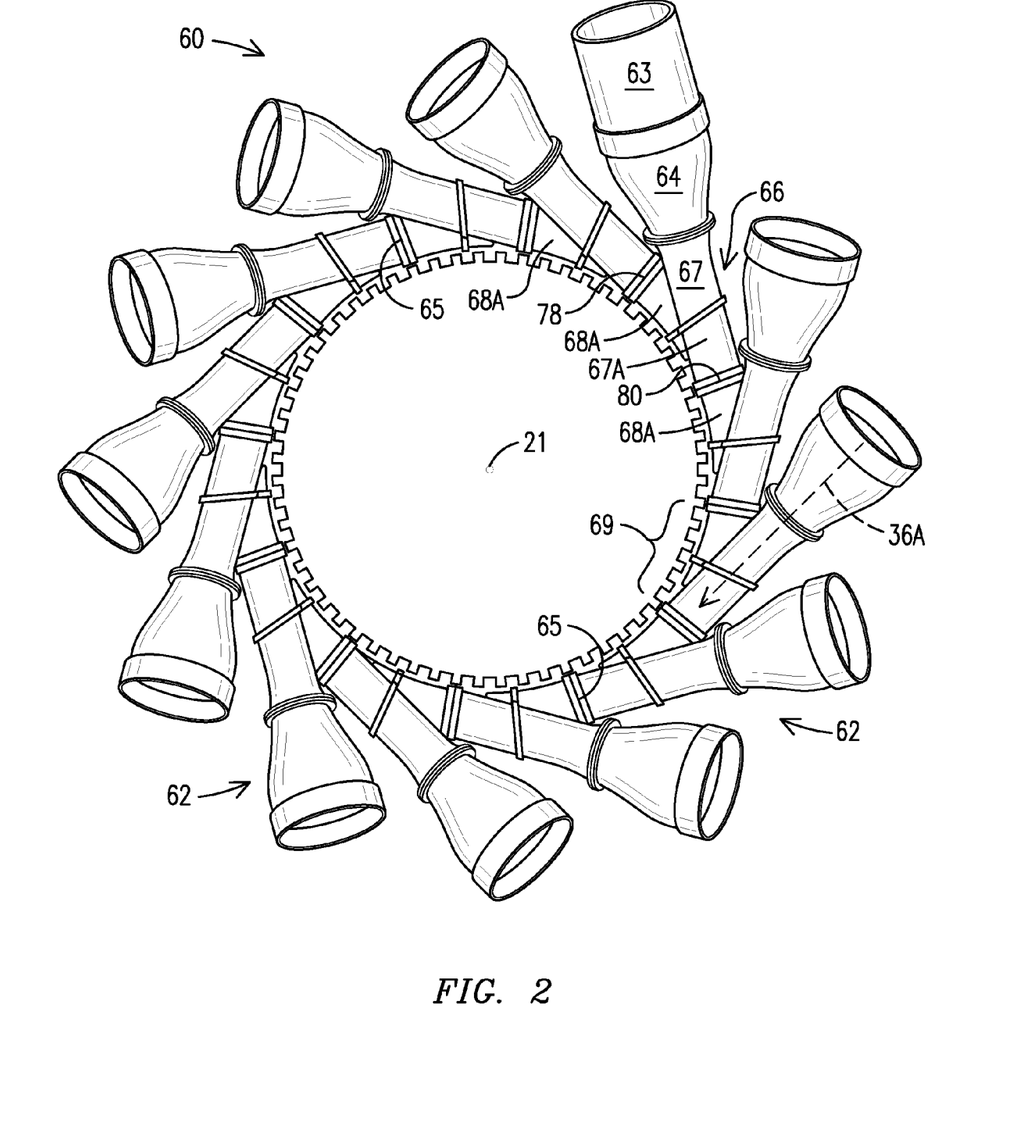
FIG. 2 is a front view of an assembly illustrating an embodiment of the invention.

FIG. 2 is a front view of an assembly 60 illustrating an embodiment of the invention. Herein, "front view" means looking in a direction from the front or inlet end of the engine rearward, while "back view" means the opposite. "Rearward" means toward the back or exhaust end of the engine. "Radially inner" and "radially outer" mean radially proximate and radially distal respectively with respect to the engine centerline 21. In the illustrations, the engine rotates clockwise when looking from a front view. However, the invention also encompasses engines that rotate counterclockwise, in which the components are reoriented accordingly.

The assembly 60 forms a circular array of flow-directing structures 62 for a respective circular array of combustors 63 (one of which is shown) centered on an engine centerline 21.

Figure 3:
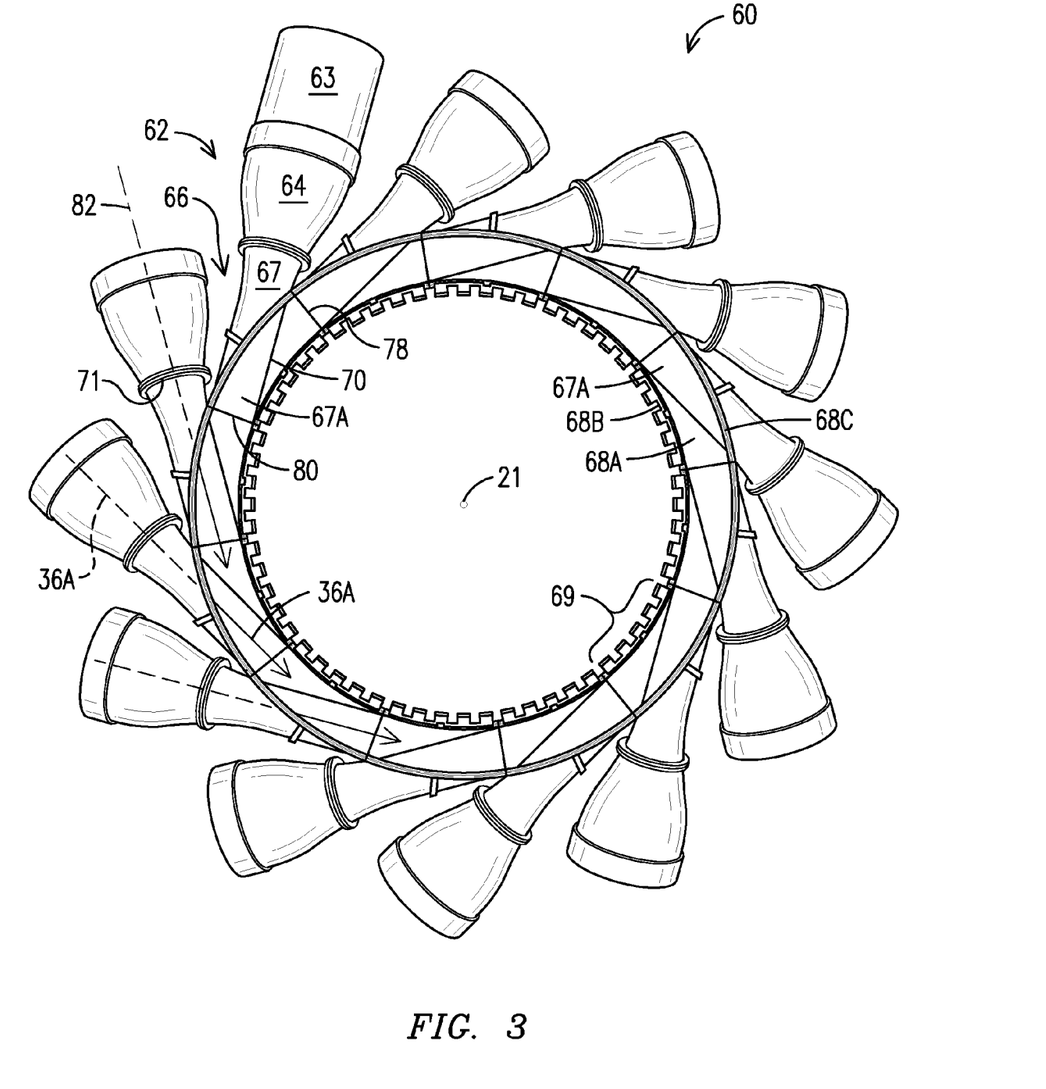
FIG. 3 is a back view of the assembly of FIG. 2.

Each flow-directing structure 62 may include a cone section 64 and an exit piece 66, which may be integral with the cone section or attached thereto. Each exit piece 66 has an inlet throat portion 67 and an outlet portion 69 that is connected 65 to two circumferentially adjacent outlet portions 69 at circumferentially upstream and downstream ends 78, 80. "Circumferentially adjacent" herein means adjacent along a circular arc centered on the engine centerline 21. The assembled outlet portions 69 together form an annular combustion gas feed chamber 68 (FIG. 3). A combustion gas flow 36A from each combustor 63 flows through a respective flow-directing structure 62.

FIG. 3 is a back view of the assembly 60 of FIG. 2. The annular chamber 68 has a front wall portion 68A, a radially inner wall 68B, and a radially outer wall 68C. It may have an outlet seal plane normal to the turbine centerline at the back edges of the inner and outer walls 68B, 68C. A merge line 70 shows where an exit piece throat 67 merges with the front wall portion 68A of the chamber 68.

The respective gas flow streams 36A enter the annular chamber 68 at discrete circumferential intervals. Each one enters in a flow direction with a circumferential component and an axially rearward component with respect to the turbine centerline 21, thus forming a helically rearward flow in the chamber 68. Each flow stream 36A is conducted by a throat 67 of an exit piece 66 as a discrete flow up to the annular chamber 68. In each throat 67, the flow 36A is bounded and directed by tubular walls, but in the annular chamber 68 the flows 36A are not separated from each other by walls. The throat 67 may morph from a circular cross section at the inlet end 71 to a non-circular cross section, especially a trapezoidal section, as it enters the outlet portion 69. The throat 67 generates a collimated flow 36A, then transitions it to a partially bounded gas flow as it enters the annular chamber 68. The assembly 60 may deliver the collimated flows in an adjacent, non-overlapping configuration to the chamber 68.

The throat 67 may maintain a constant cross-sectional area over at least most of its fully bounded length or it may converge about a constant axis 82. The inner surfaces of the throat may optionally remain within a diameter of a smallest circular inner diameter thereof along at least most of a fully bounded portion of the throat. "Smallest circular inner diameter" means the smallest diameter of the circular portion of the throat. The throat may optionally be limited to not diverging in any dimension, and optionally may converge at a constant rate, or at a constantly decreasing rate, in every dimension along at least most of its length. These are optional design features that improve collimation and reduce turbulence.

The annular chamber 68 may be mounted immediately forward of the first row of rotating turbine blades. The flows 36A therein may not be separated by walls. As a result, the flows may form a uniform and undivided helical flow immediately prior to entering the first row of turbine blades. Each gas flow 36A may be constrained to follow a straight flow path along a longitudinal axis 82 of the flow-directing structure 62. This flow path may be primarily tangential to the arc of the annular chamber 68 and partly rearward. In the annular chamber 68, the walls of the throat portion 67 that define each flow 36A cease to do so as the throat merges into the outlet portion 69 of the exit piece. The outlet portion 69 forms an arcuate segment of the annular chamber 68. The gas flow 36A continues generally helically through the annular chamber, advances rearward, exits the chamber, and impinges on the rotating blades.

Figure 4:
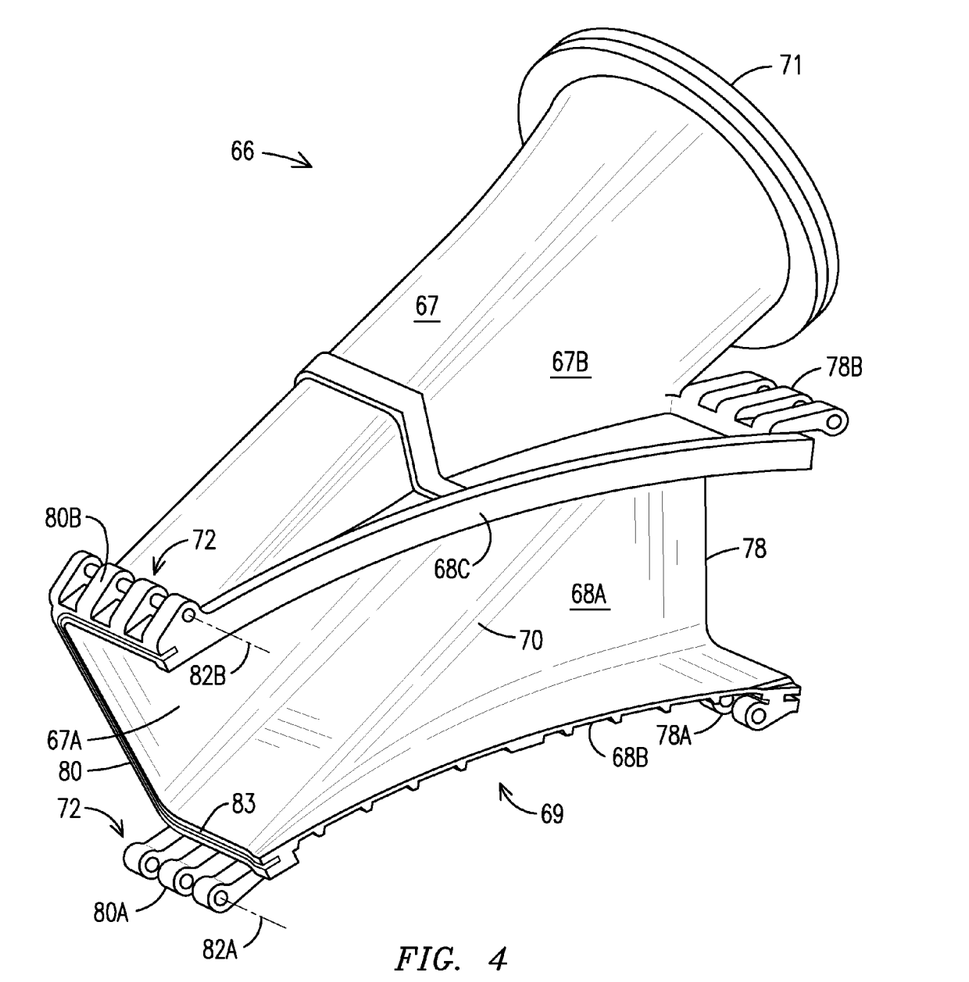
FIG. 4 is a perspective back view of an exit piece illustrating an embodiment of the invention.

FIG. 4 shows an individual exit piece 66 with mechanisms 72 that connect it to adjacent exit pieces 66 in the assembly 60 of FIGS. 2 and 3. The inlet throat 67 has an inlet end 71 that may connect to a transition component such as a cone 64 as previously shown. An arcuate outlet portion 69 of the exit piece 66 comprises a front wall 68A and radially inner and outer walls 68B, 68C, which together form a segment of the annular chamber 68. The outlet portion 69 has circumferentially upstream and downstream ends 78, 80, each of which may define a seal plane with respect to an adjacent exit piece 66. Each circumferential end of the outlet portion may have a radially inner hinge part 78A, 80A and a radially outer hinge part 78B, 80B. Each hinge part hingedly connects to a mating hinge part on an adjacent exit piece. Each hinge part has a hinge axis 82A, 82B that may be oriented parallel to the engine centerline. This orientation allows the hinge pin to ride thermal expansion and contraction of the annular chamber 68 in the radial direction with minimal shear, thereby maintaining the duct connection during transient conditions.

Figure 6:
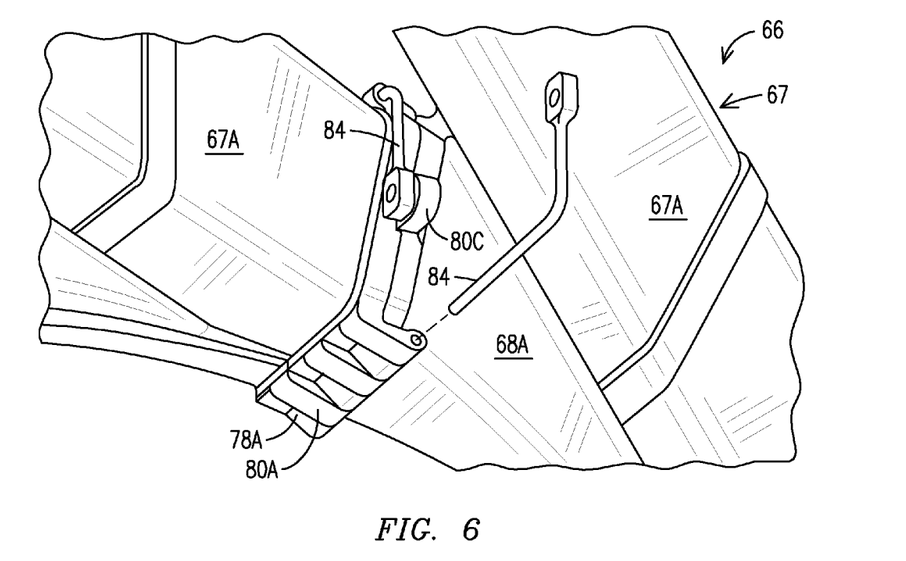
FIG. 6 is a perspective front view of a connection in progress between adjacent exit pieces.

The inner hinge part 78A on the upstream end 78 may comprise a female segmented hinge barrel set back from the end 78. The inner hinge part 80A on the downstream end 80 may comprise a male segmented hinge barrel that extends beyond the end 80. The outer hinge part 78B on the upstream end 78 may comprise a male segmented hinge barrel that extends beyond the end 78. The outer hinge part 80B on the downstream end 80 may comprise a female segmented hinge barrel set back from the end 80. This arrangement maximizes access for assembly, allowing hinge pins to be inserted and removed linearly as shown in FIG. 6. Other cooperative combinations of male and female hinge portions may be contemplated in other embodiments within the scope of the present invention. Compared to common flange-and-bolt connections, this arrangement improves on the maintainability of the assembly, as fewer parts are used and the parts are easily removable (i.e. two pins and one fastener per connection). The hinge structures may be formed by straightforward machining operations. Line boring of the pinned lugs and drilling of the lock bolt hole may be completed during other already necessary machining setups so that no special setup is required. All pin bores are back side accessible and may be installed during facing and lug slotting machining processes. Pins may be machined from rectangular bar stock and bent to form the desired final shape. Serviceability is simple when compared to common flange-and-bolt connections, since removing one fastener on the side of the duct joint is easier than removing multiple nuts and bolts along the top, bottom and side of the separation line.

The front wall 68A of each exit piece 66 may be coplanar with a back wall 67B of the throat portion 67, and also coplanar with a front wall 67A of the circumferentially adjacent upstream throat 67 in the assembly 60. This provides precisely adjacent convergence of the respective gas flows 36A entering the annular chamber 68 from adjacent throats 67, allowing each incoming flow 36A to converge with adjacent flows 36A in a non-overlapping flow geometry without gaps between adjacent flows 36A.

Figure 5:
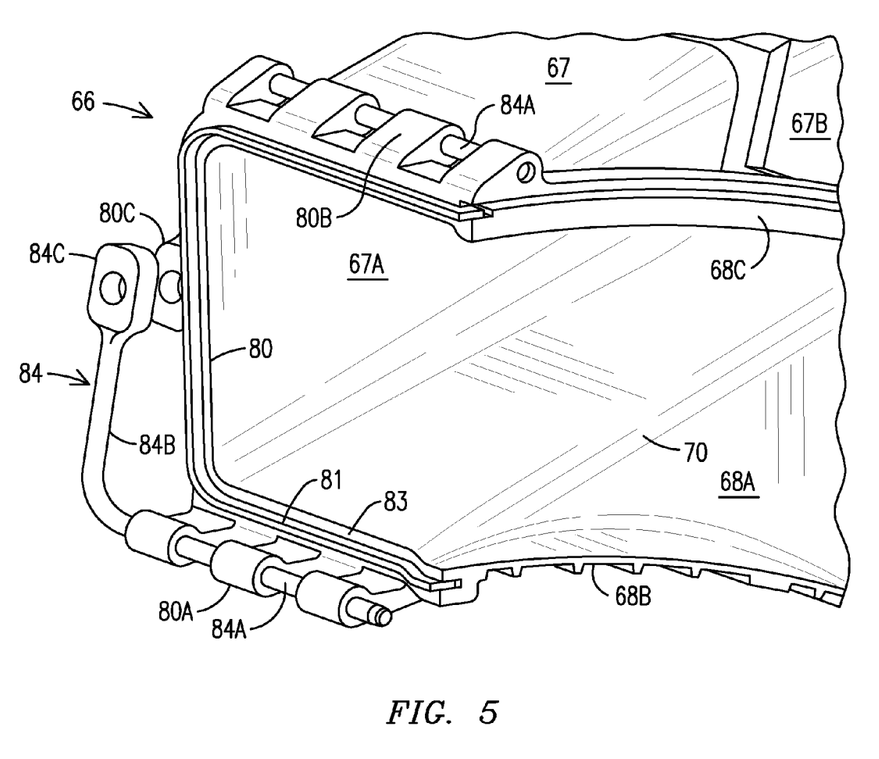
FIG. 5 is a perspective back view of a downstream end of an outlet portion of the exit piece of FIG. 4 with a hinge pin installed.

FIG. 5 shows an enlarged back view of the circumferentially downstream end 80 of the outlet portion 69 of an exit piece 66. An L-shaped hinge pin 84 may include a first portion 84A inserted in the hinge barrel 80A, and a second portion 84B with an end 84C that fastens to a boss 80C on a front side 67A of the outlet portion of the exit piece 66 or the adjacent exit piece. A blade seal 81 or other known sealing mechanism may be used to limit gas passage across the seal face 83.

FIG. 6 shows a front view of two adjacent exit pieces in the process of interconnection with inner and outer L-shaped pins 84.

Figure 7:
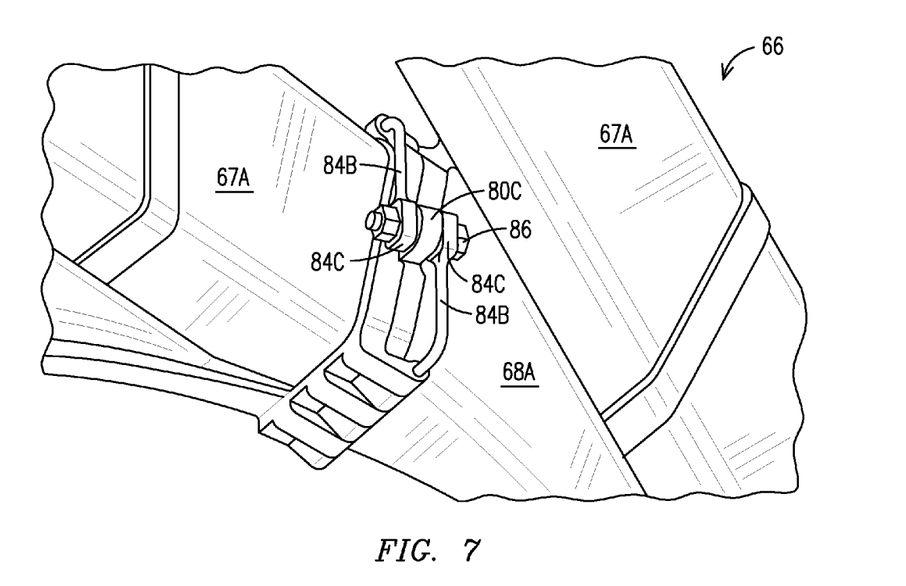
FIG. 7 is a view as in FIG. 6 showing finalization of the connection.

FIG. 7 shows fastening of the interconnection of FIG. 6 with a bolt 86 through the boss 80C and pin ends 84C. Any fastening means may be used for this purpose, such as a latch, a spring-loaded peg/pin/clamp/clip/hook, a clamp, a pin-clutch pair, a threaded fastener with internal threads on the pins and boss, etc. Other mechanisms for retaining the pins 84 in position within the mated hinge parts may be envisioned within the scope of the present invention, including securing each pin separately, securing one or both pins to a structure other than a boss formed on the exit piece, forming a pin as a bolt with a threaded end opposed its head, etc.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. An exit piece for conducting combustion gas from a combustor to a first stage of turbine blades of a gas turbine engine, the exit piece comprising:
   an inlet portion; and
   an outlet portion comprising a circumferentially upstream end and a circumferentially downstream end relative to a direction of rotation of a rotor shaft about an engine centerline;
   wherein each circumferential end of the outlet portion comprises a radially inner hinge part and a radially outer hinge part relative to the engine centerline; and
   wherein each of the hinge parts is configured to directly hingedly connect to a mating hinge part on a respective adjacent outlet portion of an adjacent exit piece when assembled in the gas turbine engine.

2. The exit piece of claim 1, wherein each of the hinge parts comprises a hinge axis that is parallel to the engine centerline.

3. The exit piece of claim 1, wherein each of the hinge parts hingedly connects to its respective mating hinge part via a first portion of a hinge pin inserted in the hinge part with a hinge axis parallel to the engine centerline, and the hinge pin further comprises a second portion configured to fasten to a boss formed on the exit piece or on the respective adjacent exit piece.

4. The exit piece of claim 1, wherein:
   the outer hinge part on the downstream end of the outlet portion comprises a segmented hinge barrel set back from a seal plane of said downstream end; and
   the outer hinge part on the upstream end of the outlet portion comprises a segmented hinge barrel extending beyond a seal plane of said upstream end, wherein each hinge barrel comprises an axis parallel to the engine centerline.

5. The exit piece of claim 4, wherein:
   the inner hinge part on the downstream end of the outlet portion comprises a segmented hinge barrel extending beyond the seal plane of the downstream end; and
   the inner hinge part on the upstream end of the outlet portion comprises a segmented hinge barrel set back from the seal plane of the upstream end.

6. The exit piece of claim 1, wherein the upstream end of the outlet portion is configured for fluid communication with an outlet end of an upstream adjacent exit piece, and wherein the downstream end of the outlet portion is configured for fluid communication with an outlet end of a downstream adjacent exit piece.

7. The exit piece of claim 1, wherein at least one of the hinge parts at the circumferentially upstream end comprises plural knuckles, and wherein at least one of the hinge parts at the circumferentially downstream end comprises plural knuckles.

8. An annular array of adjacent exit pieces, wherein each exit piece is formed in accordance with claim 1, wherein respective radially inner and radially outer hinge parts of a downstream end of each exit piece are engaged with respective radially inner and radially outer hinge parts of an upstream end of an adjacent exit piece, and each pair of engaged hinge parts is joined by a respective hinge pin.

9. The annular array of adjacent exit pieces of claim 8, wherein a first one of each pair of engaged hinge parts comprises a segmented hinge barrel set back from a seal plane between the respective adjacent exit pieces, and a second one of each pair of engaged hinge parts comprises a segmented hinge barrel extending beyond the seal plane to form a hinge axis parallel to the engine centerline.

10. The annular array of adjacent exit pieces of claim 9, further comprising an outer hinge pin and an inner hinge pin joining the respective engaged hinge parts of a respective upstream end with a respective downstream end of adjacent exit pieces are affixed to a boss formed on one of the respective adjacent exit pieces.

11. A plurality of exit pieces for conducting combustion gas from a respective plurality of can annular combustors to a first stage blade section of a gas turbine, each exit piece comprising:
   an inlet throat that receives combustion gas from a respective one of the combustors; and
   an outlet portion comprising a segment of an annular combustion gas feed chamber;
   wherein the outlet portion comprises a circumferentially upstream end connected to an adjacent circumferentially upstream one of the exit pieces by a first radially inner hinge and a first radially outer hinge, and the outlet portion comprises a circumferentially downstream end connected to an adjacent circumferentially downstream one of the exit pieces by a second radially inner hinge and a second radially outer hinge;
   wherein in each hinge respective hinge parts directly engage each other about a hinge axis, and
   wherein upstream and downstream are relative to a direction of rotation of rotor blades about a centerline of the turbine.

12. The apparatus of claim 11, wherein each hinge comprises a segmented hinge barrel extending beyond a seal plane of a first of a respective pair of adjacent exit pieces, a cooperating segmented hinge barrel set back from the seal plane of a seal plane of a second of a respective pair of adjacent exit pieces, and a hinge pin disposed there through.

13. The apparatus of claim 12, further comprising a boss formed on one of the respective pair of adjacent exit pieces, and an end of the hinge pin affixed to the boss.

14. The apparatus of claim 13, wherein the plurality of exit pieces forms a circular array about the turbine centerline, each inlet throat provides a straight flow path from an inlet end thereof to the annular chamber, and each flow path is primarily tangential relative to an arc of the annular chamber, and partly rearward.

15. The plurality of exit pieces of claim 13 wherein each inlet throat fully bounds a gas flow from one of the combustors, and delivers the gas flow to the annular feed chamber in a primarily tangential and partly rearward direction, wherein adjacent ones of the exit pieces provide respective gas flows that enter the feed chamber adjacently in a converging flow configuration.

16. An exit piece assembly for delivering gasses from a plurality of can annular combustors to a first stage blade section of a gas turbine, the assembly comprising;
- a flow-directing structure comprising a plurality of interconnected exit pieces, each exit piece configured to receive a gas flow from a respective combustor;
- each exit piece comprising a throat portion and an outlet portion that forms a circumferential segment of an annular chamber;
- wherein the outlet portion comprises a front wall that is coplanar with a back wall of the throat portion and is further coplanar with a front wall of an upstream adjacent throat portion, wherein upstream is relative to a direction of rotation of a rotor shaft about a centerline of the turbine;
- wherein the annular chamber is formed of a circular array of the outlet portions interconnected by respective hinges with respective axes parallel to the centerline of the turbine; and
- wherein adjacent ones of the exit pieces guide respective gas flows to converge into the chamber into a generally helical flow.

17. The assembly of claim 16, wherein each outlet portion comprises:
- a circumferentially downstream end comprising a radially outer segmented hinge barrel set back from a seal plane of said downstream end, and a radially inner segmented hinge barrel extending circumferentially beyond the seal plane of said downstream end; and
- a circumferentially upstream end comprising a radially outer segmented hinge barrel extending circumferentially beyond a seal plane of said upstream end, and a radially inner segmented hinge barrel set back from the seal plane of said upstream end.

18. The assembly of claim 17, wherein each segmented hinge barrel on said each outlet portion is joined to a mating segmented hinge barrel on an adjacent outlet portion by an L-shaped pin comprising a first leg inserted through both the segmented hinge barrel and the mating segmented hinge barrel, and a second leg that is fastened to a boss on a front side of the outlet portion or on a front side of the adjacent outlet portion.

* * * * *